Aug. 7, 1945. W. BAUSCH 2,381,101
OCULAR TUBE
Filed Nov. 4, 1942
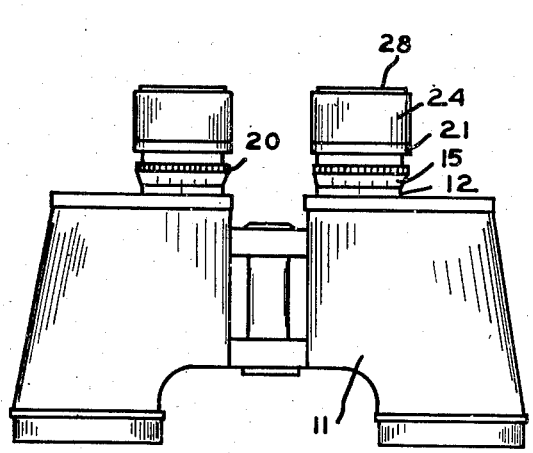
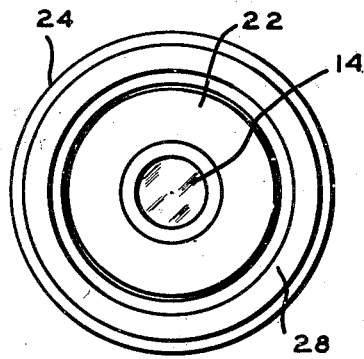
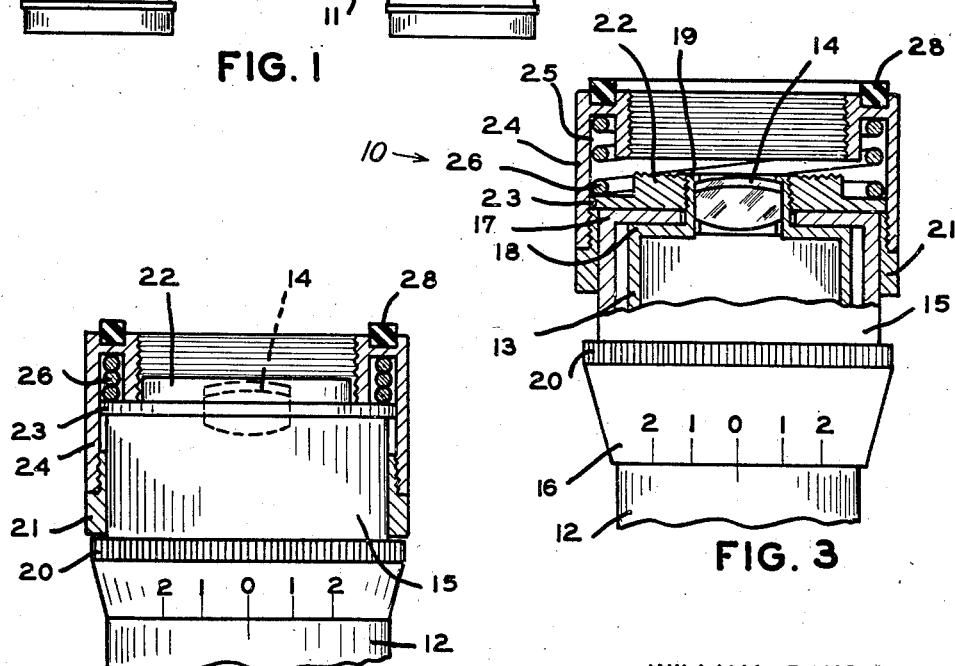
WILLIAM BAUSCH
INVENTOR.
BY
ATTORNEYS Patented Aug. 7, 1945

2,381,101

UNITED STATES PATENT OFFICE 2,381,101

OCULAR TUBE

William Bausch, Rochester, N. Y., assignor to Bausch & Lomb Optical Company, Rochester, N. Y., a corporation of New York Application November 4, 1942, Serial No. 464,463

3 Claims. (Cl. 88—32)

This invention relates to eyepieces for optical instruments and more particularly to an adjustable eye cap for such instruments.

The eye cap of the present invention in the broadest aspects thereof may be used on any instrument in which the eye of the user is brought into close proximity to the eyepiece in the use of the instrument. It is particularly adapted to a binocular and for the purpose of illustrating the present invention, the eye cap has been shown as applied to a binocular.

Binoculars are generally constructed with an eye cap which when brought up against the face adjacent the eye of the observer spaces the former the proper distance from the eye lens of the instrument. Although such binoculars can be used by observers wearing eyeglasses, gas masks, or any device in which corrective or protective lenses are worn in front of the eye, the field of view is considerably reduced as the eye is spaced a greater distance from the eye lens of the instrument.

This difficulty is obviated by the eye cap of the present invention, for the eye cap is telescopically mounted to the ocular tube of the instrument and is movable axially thereof so that it can be moved to alternate positions relative to the ocular tube. It is normally held in one position by a resilient means such as a spring of such a size that it can be easily compressed by merely bringing the eye cap up against the lens of the device worn by the user and urging the eye cap back against the lens. The user must hold the eye cap in the collapsed position by holding the eye cap against the lens for the spring will return the cap to its normal position as soon as the instrument is moved away from the face.

The eye cap is preferably formed with a resilient guard such as rubber to protect the lenses of the device worn by the user.

Other features and advantages of the device of the present invention will appear from the following description taken in connection with the accompanying drawing in which:

Fig. 1 is an elevational view of the binocular showing my eye cap applied thereto.

Fig. 2 is a top plan view of an ocular tube to which my eye cap has been mounted.

Fig. 3 is a sectional view partly in elevation of the eye cap of the present invention and showing the same in its normal position.

Fig. 4 is a view similar to Fig. 3, but showing the eye cap in the position which it assumes when the binocular is being used by an observer wearing eyeglasses or the like.

There is shown in the drawing the now-preferred embodiment of the present invention as applied to a binocular in which each ocular piece 10 of the instrument 11 comprises a tube 12, carried by the body of the instrument, telescopically receiving a tube 13. The tube 13 carries the eyepiece of the instrument including the eye lens 14 and is adjustable relative to the tube 12 so that the instrument may be focused by different users.

To indicate the relative adjusted position of the tube 13, a diopter band 15 carrying suitable scale indicia 16 is formed with an annular flange 17 secured in facewise engagement to a shoulder 18 formed by a reduced portion 19 of the tube 13. The band also sleeves the tube 12 and is formed with a knurled collar 20 to permit a user to rotate the band and the tube as a unit when it is necessary to telescopically adjust the relative positions of the two tubes.

The eye cap assembly of the present invention in the form now preferred, comprises a collar 21 having an inner diameter large enough to sleeve the diopter band 15 and an internally threaded ring 22 having a flange 23 of a diameter greater than the inner diameter of the collar 21. The collar 21 is formed with a reduced threaded portion concentrically mounted in a tubular shield 24.

The shield 24, which has an inner diameter slightly larger than the diameter of the flange 23, is reversely bent at one end thereof to form an annular pocket 25 for receiving one end of a coiled spring 26, the opposite end of which acts against the flange 23 of the ring 22 when the same is coaxially mounted within the shield.

The reduced portion of the collar 21 threaded into the end of the shield 24 opposite the pocket 25 forms a stop shoulder and prevents the ring from being urged out of the shield 24.

The eyecap assembly is fixed to the reduced portion 19 of the tube 13 by threading the ring 22 thereon until the flange 17 of the diopter band 15 is clamped between the one surface of the flanged ring 22 and the outer surface of the shoulder 18 of the tube 12. If desired, some suitable means such as a set screw may be used to hold the ring 22 from backing off the reduced portion of the tube 12.

It will be seen that with the eye cap assembled with the ocular piece of the instrument, the spring 26 tends to hold the shield 24 in the position in which the stop shoulder of the collar 21 engages the underneath surface of the flange 23. Thus the flange 23 limits the movement of the shield 24 and prevents the eye cap from being urged off the end of the ocular tube 10.

On the other hand, the spring 26 is very resilient and can easily be compressed by applying force to the eye cap axially of the tube 10. Such a force will cause the collar 21 and the attached shield 24 to move longitudinally of the tube 10, until the edge face of the reversely bent end of the shield 24 is brought into engagement with the flange 23.

To insure that the collar 21 will slide longitudinally of the diopter band 15, the interior surface of the same should be accurately formed and of such a diameter relative to the diameter of the outer surface of the band 15 that the collar cannot bind as it is moved along the band 15.

In the use of binoculars equipped with the eye cap of the present invention, a user, who is not wearing eyeglasses or goggles such as are fitted into gas masks or similar devices, brings the binocular up into position in the front of his eyes and his eyes will be properly spaced from the eye lens 14 to insure him the maximum field.

If the observer is wearing eyeglasses or goggles, after properly adjusting the instrument before his eyes, he may force the eye cap to move back to the position shown in Fig. 4. It will be seen that in this position of the eye cap, the eye of the user will be located approximately the same distance from the eye lens 14 as the eye of an observer not having lenses in front of his eyes as when the eye cap is used as shown in Fig. 3. Thus, an observer wearing eyeglasses or goggles by this adjustment of the eye cap may be afforded as large a field as is possible with the optics of the instrument.

To protect the lenses of the device worn by the user, the eye cap 24 carries a suitable guard 28 formed of some resilient material such as rubber or the like. Although the guard 28 may take any shape desired, it has been shown herein as a ring of uniform thickness.

While one embodiment of the invention has been disclosed, it is to be understood that the invention need not be limited to the device as described, but is susceptible of modification falling within the spirit of the invention and the scope of the appended claims.

I claim:

1. In a device having an ocular tube carrying an eye lens, the combination of an eye cap comprising an annular member sleeving said tube; a ring coaxially mounted on one end of said tube; a flange carried by said ring having a diameter greater than the inner diameter of said annular member; a shield having an inwardly projecting portion, said shield coaxially secured to said annular member and movable therewith; a spring seating on said flange and engaging the portion to normally hold said annular member against the under surface of said flange, the other surface of said flange limiting movement of said shield in the opposite direction; and a resilient eye cap carried by said shield and movable therewith to alternate positions relative to said lens whereby the eye of a user can be adjusted relative to said lens.

2. In an instrument of the type described, the combination of an ocular tube carrying a lens, a ring coaxially secured to the ocular tube and having a stepped shoulder at its periphery projecting beyond the tube, a tubular shield coaxial with said ring and slidably mounted with respect thereto, stop means on the lower portion of said shield comprising an inwardly projecting part constructed to engage the under side of said ring, the upper portion of the shield having a downwardly projecting portion forming a recess, and a coil spring surrounding the lens, one end of the spring being located in the recess, the other end of the spring engaging said stepped shoulder whereby said shield is yieldably held in position with the stop means normally engaging said ring.

3. In an instrument of the type described, the combination of an ocular tube carrying a lens, a sleeve mounted coaxially on the tube and having an inturned shoulder portion, a ring secured coaxially on the tube, said ring having a stepped, peripheral shoulder projecting beyond the tube, a tubular shield coxial with and slidably mounted on the sleeve, the upper portion of the shield having an internal recess, inwardly projecting stop means on the shield constructed to engage the under side of said ring and a coil spring positioned in said recess and engaging the stepped shoulder on said ring whereby the shield is yieldably held in extended relation to the ocular tube.

WILLIAM BAUSCH.